（12）United States Patent
Jung et al.

(10) Patent No.: US 7,488,876 B2
(45) Date of Patent: Feb. 10, 2009

(54) METHOD FOR SELECTIVELY SEPARATING SEMICONDUCTIVE CARBON NANOTUBES

(75) Inventors: Kyeong-Taek Jung, Suwon-si (KR); Seok-Hyun Cho, Seoul (KR); Young-Hee Lee, Suwon-si (KR); Kay-Hyeok An, Suwon-si (KR)

(73) Assignee: Samsung Corning Precision Glass Co., Ltd. (KR)

( * ) Notice: Subject to any disclaimer, the term of this patent is extended or adjusted under 35 U.S.C. 154(b) by 630 days.

(21) Appl. No.: 11/127,816

(22) Filed: May 11, 2005

(65) Prior Publication Data

US 2005/0255031 A1  Nov. 17, 2005

(30) Foreign Application Priority Data

May 12, 2004  (KR) ..................... 10-2004-0033587

(51) Int. Cl.
  *C01B 31/02* (2006.01)
(52) U.S. Cl. ...................................... 977/845; 423/461
(58) Field of Classification Search ................ 423/461, 423/447, 460, 445 B; 210/634, 767, 806, 210/638, 639, 768, 770, 774; 977/742, 750, 977/751, 842, 845; 209/1, 155
See application file for complete search history.

(56) References Cited

OTHER PUBLICATIONS

An et al., "A Diameter-Selective Attack of Metallic Carbon Nanotubes by Nitronium Ions" 2005, J. Am. Chem. Soc., 127, pp. 5196-5203.*
An et al., "A Diameter-Selective Chiral Separation of Single-Wall Carbon Nanotubes Using Nitronium Ions" 2006, Journal of Electronic Materials, vol. 35, No. 2, pp. 235-242.*
Forsman et al., "Intercalation of Graphite by Nitronium Ion Attack," 1980, Synthetic Metals, 2, pp. 171-176.*
Chattopadhyay et al., "A Route for Bulk Separation of Semiconducting from Metallic Single-Wall Carbon Nanotubes" 2003, J. Am. Chem. Soc., 125, pp. 3370-3375.*
Georgakilas et al., "Purification of HiPCO Carbon Nanotubes via Organic Functionalization" 2002, J. Am. Chem. Soc., 124, pp. 14318-14319.*

* cited by examiner

*Primary Examiner*—Wayne Langel
*Assistant Examiner*—Brittany M Martinez
(74) *Attorney, Agent, or Firm*—Baker & Hostetler, LLP

(57) ABSTRACT

Semiconducting type carbon nanotubes are efficiently separated from a mixture of semiconducting and metallic carbon nanotubes in a simple manner, by way of treating the carbon nanotube mixture with an organic solution containing nitronium ions, filtering the resulting mixture to recover remaining solids, and heat-treating the solids.

7 Claims, 1 Drawing Sheet

METHOD FOR SELECTIVELY SEPARATING SEMICONDUCTIVE CARBON NANOTUBES

FIELD OF THE INVENTION

The present invention relates to a method for selectively separating semiconducting carbon nanotubes from a mixture of semiconducting and metallic carbon nanotubes.

BACKGROUND OF THE INVENTION

Carbon nanotubes have been applied in various fields including memory devices, electronic amplifiers, gas sensors, electronic wave shielding apparatuses, electrode plates of electrochemical storage apparatuses (e.g., secondary battery, fuel battery and supercapacitor), field emission displays, and polymer composites, due to their good mechanical, chemical and electrical properties.

In general, a carbon nanotube has a diameter of a few to several tens nm and a length of several tens μm, and it may be of an anisotropic configuration such as a single-wall, multi-wall or rope shape. Further, most carbon nanotubes have chiral configurations helically arranged along the tubular axis, and such chiral characteristics of the carbon nanotubes represent an important factor for determining the electrical conductivity of a particular batch of carbon nanotubes.

However, the chirality of carbon nanotubes produced by conventional methods such as are discharging, laser ablation, and chemical vapor deposition, is difficult to control, and, therefore, the carbon nanotubes produced by such methods are in the form of a mixture of the two types: conductive and semi-conductive. Accordingly, in order to obtain carbon nanotubes having suitable conductivity characteristics for its final use, it is required to selectively separate one desired type of carbon nanotubes from a mixture of two types of carbon nanotubes.

As such an attempt, there has been developed a method of employing a surfactant such as octadecylamine (ODA) to separate only the metallic type carbon nanotubes from the mixture-type carbon nanotubes (see *Journal of the American Chemical Society*, 125, p 3370, 2003). However, this method has the problems of difficulty in removing the surfactant remaining after the separation and a low yield. Further, a method of separating metallic type carbon nanotubes from a suspension of carbon nanotubes in $D_2O$ by electrophoresis was attempted (see *Science*, 301, p 345, 2003), but this method gives a low productivity and a low yield.

Therefore, it is required to develop an effective method for separating a desired type carbon nanotube in a large scale.

SUMMARY OF THE INVENTION

Accordingly, it is a primary object of the present invention to provide a method of efficiently separating semiconducting type carbon nanotubes from a mixture of semiconducting and metallic carbon nanotubes in a simple manner.

In accordance with one aspect of the present invention, there is provided a method of separating semiconducting type carbon nanotubes from a mixture of semiconducting and metallic carbon nanotubes, comprising the steps of:

1) treating the carbon nanotube mixture with an organic solution containing nitronium ions,
2) filtering the resulting mixture to recover remaining solids, and
3) heat-treating the solids.

BRIEF DESCRIPTION OF THE DRAWINGS

The above and other objects and features of the present invention will become apparent from the following description thereof, when taken in conjunction with the accompanying drawings which respectively show.

DETAILED DESCRIPTION OF THE INVENTION

Figure 1A:
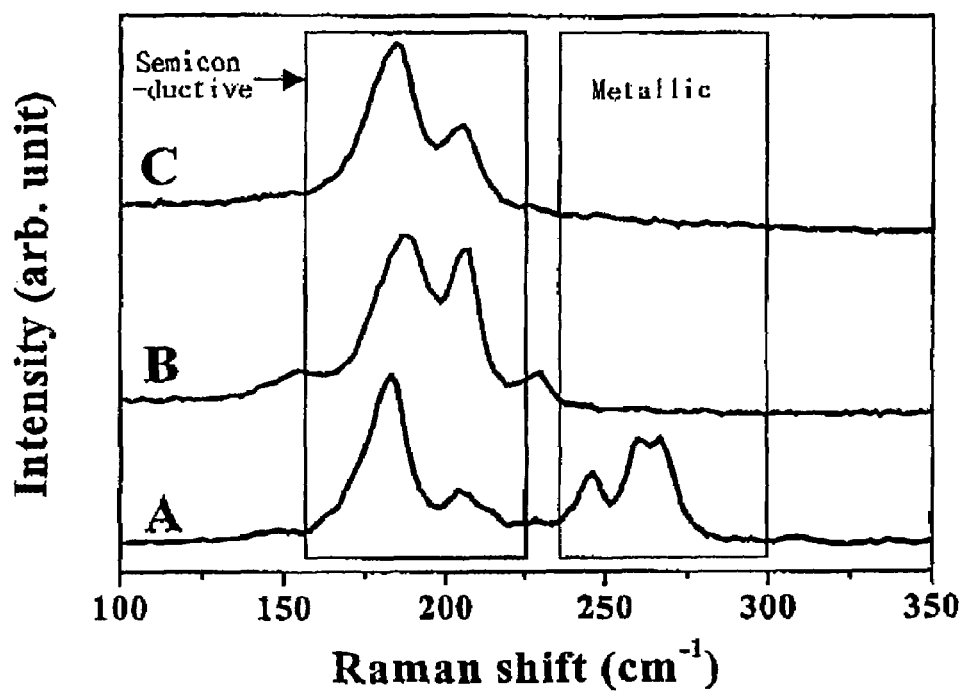
FIGS. 1*a* and 1*b*: Raman spectra of the carbon nanotubes before and after the nitronium treatment according to the present invention.

The inventive method is characterized in that a mixture of semiconducting type and metallic type carbon nanotubes is treated with an organic solution containing nitronium ions to allow the formation of a bond between the nitronium ions and metallic carbon nanotube and removing the nitronium ion bonded metallic carbon nanotubes which readily dissolve in the organic solution Carbon nanotubes, which may be used as the starting material in the inventive method, include those prepared in a conventional process, e.g., an arc discharging, laser deposition, high-pressure CO conversion (HiPCO), or chemical vapor deposition (CVD) method, and preferably, they may be purified by a gas phase heat-treatment or acid-treatment in order to remove impurities such as metals, amorphous carbon components, and others. The carbon nanotubes prepared by the above-mentioned conventional methods typically comprises both semiconducting type carbon nanotubes and metallic type carbon nanotubes.

In accordance with the present invention, the starting carbon nanotubes are treated with an organic solution containing nitronium ions. The organic nitronium ion-containing solution may be prepared by dissolving a nitronium compound in an organic solvent. Representative examples of the nitronium compound include nitronium tetrafluoroborate ($NO_2BF_4$), nitronium hexafluoroantimonate ($NO_2SbF_6$), and a mixture thereof, and representative examples of the organic solvent include methyl alcohol, ethyl alcohol, isopropyl alcohol, chloroform, dichloroethane, tetramethylene sulfone, benzene, acetone, xylene, toluene, N,N-dimethylformamide, 1-methyl-2-pyrrolidinone and a mixture thereof.

The organic nitronium ion-containing solution may have a nitronium ions concentration of 0.01 to 1 M. If the concentration of the nitronium ions exceeds 1 M, the semiconducting carbon nanotubes may also be affected, thus lowering the yield of the semiconducting carbon nanotubes, while if it is less than 0.01 M, the treatment requires an exceedingly long period.

The mixture of the carbon nanotubes and the nitronium solution is stirred to allow the metallic carbon nanotubes to respectively react with the nitronium ions, and the reaction may be preferably carried out at a temperature ranging from ambient temperature to 100° C. for 1 hour to 10 weeks. At this time, nitronium ions ($NO_2^+$) present in the nitronium solution selectively bonds with metallic type carbon nanotubes and the resulting product readily dissolves in the organic solvent used in the nitronium-treatment. In the course of such bonding, the counter ion of the nitronium ion of the organic nitronium solution, i.e., $BF_4^-$ and $SbF_6^-$ intercalates in the space between the layer structures of metallic carbon nanotube to facilitate the permeation of the nitronium ions into the metallic carbon nanotubes.

The reaction temperature and period may be varied depending on the concentration of the nitronium solution and the kind of the nitronium compound employed, and if the temperature is exceedingly high or the period is exceedingly long, the semiconducting type carbon nanotubes may also react with the nitronium ions to lower the yield.

After the treatment with the nitronium solution, the resulting mixture is filtered with a filter, to collect remaining solids which largely consist of remaining semiconducting type carbon nanotubes. The solids may be preferably washed with an organic solvent to remove remaining nitronium compounds therefrom.

The semiconducting type carbon nanotubes-containing solids thus collected is then subjected to a heat-treatment process. The heat-treatment may be carried out at a temperature ranging from 400 to 1,500° C. for 10 minutes to 10 hours. During this heat-treatment, the functional groups (NO, $NO_2$ and $NO_3$) bound on the surface of the semiconducting type carbon nanotube are removed and the crystallinity of the carbon nanotube increases. If the temperature or the period for the heat-treatment is greater than the upper limit, the end portion of the carbon nanotabe may become fused, and if it is less than the lower limit, some of the functional groups remain intact, which generate problems in the post-processing procedure of the carbon nanotubes.

In accordance with the present invention, semiconducting type carbon nanotubes, which may be beneficially used in various fields including memory devices and sensors, can be efficiently separated from a mixture of semiconducting and metallic carbon nanotubes in a simple manner in a large scale. The inventive method provides a removal efficiency of the removal rate of the metallic type carbon nanotubes of 99% or more.

The present invention is further described and illustrated in the following Examples, which are, however, not intended to limit the scope of the present invention.

EXAMPLE

Semiconducting type carbon nanotubes were selectively separated from a mixture of carbon nanotubes obtained by an arc discharging method, as follows.

10 mg of carbon nanotube powder was charged to 100 ml of 0.015 M nitronium tetrafluoroborate solution prepared by dissolving an appropriate amount of nitronium tetrafluoroborate in a 1:1 (v/v) mixture of chloroform and trimethyl sulfone, and the resulting mixture was stirred at 40° C. for 12 hours or 3 weeks, and the remaining powder was recovered by filtering. The obtained solids was heat-treated at 600° C. for 30 minutes in order to remove the residual functional groups on the surface of the carbon nanotubes (yield 99%).

Figure 1B:
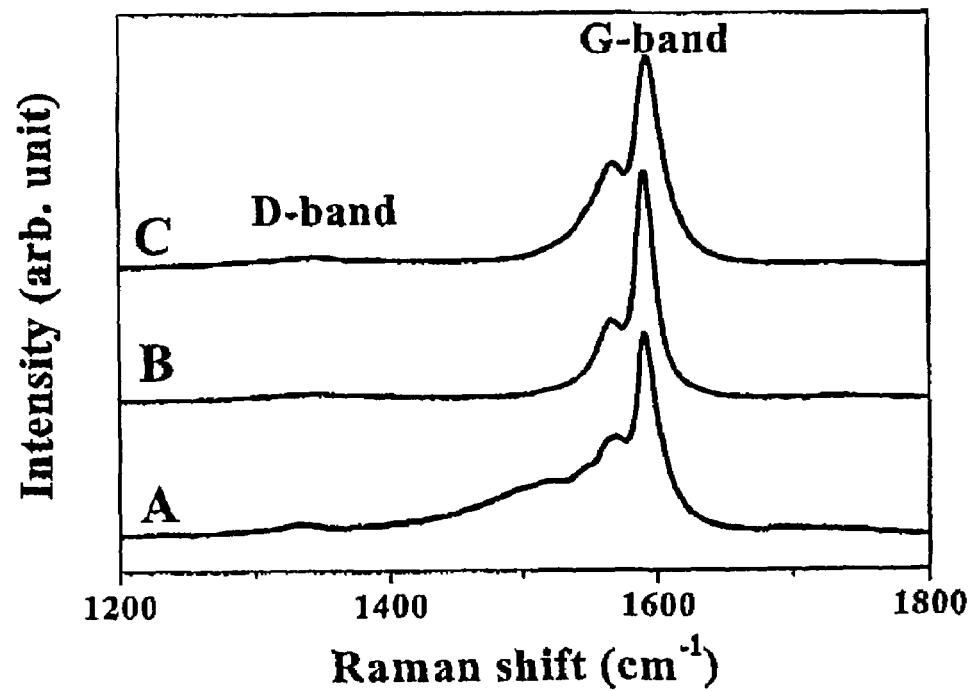

The carbon nanotubes before and after the treatment with the nitronium solution were analyzed with a Raman scattering apparatus (Renishaw, Invar basic, USA), and the results are shown in FIGS. 1a and 1b.

FIG. 1a, RBM (radial breathing mode) Raman spectra, shows that the carbon nanotube before the treatment (Curve A) reveals both the characteristic peaks of semiconducting type carbon nanotube (185 and 210 $cm^{-1}$) and the metallic type carbon nanotube (250 and 265 $cm^{-1}$), whereas the carbon nanotubes obtained after nitronium-treatments for 12 hours and for 3 weeks (Curves B and C, respectively) show only the peaks for semiconducting type carbon nanotube.

Further, FIG. 1b, TM (tangential mode) Raman spectra, shows that in all of Cues A, B and C, the peaks of the G-band are distinctly resolved from the peaks of the D-band which are generally caused by the presence of structural defects or amorphous carbon. This suggests that the intrinsic structure of the carbon nanotubes is not deformed even after the nitronium-treatment according to the present invention.

While some of the preferred embodiments of the subject invention have been described and illustrated, various changes and modifications can be made therein without departing from the spirit of the present invention defined in the appended claims.

What is claimed is:

1. A method of separating semiconducting type carbon nanotubes from a mixture of semiconducting and metallic carbon nanotubes, comprising the steps of:
    1) treating the carbon nanotube mixture with an organic solution containing nitronium ions,
    2) filtering the resulting mixture to recover remaining solids, and
    3) heat-treating the solids.

2. The method of claim 1, wherein the organic solution is prepared by dissolving a nitronium compound in an organic solvent.

3. The method of claim 1, wherein step 1) is carried out at a temperature ranging from ambient temperature to 100° C. for 1 hour to 10 weeks.

4. The method of claim 1, wherein the organic solution comprises nitronium ions at a concentration of 0.01 to 1 M.

5. The method of claim 2, wherein the nitronium compound is nitronium tetrafluoroborate ($NO_2BF_4$), nitronium hexafluoroantimonate ($NO_2SbF_6$), or a mixture thereof.

6. The method of claim 2, the organic solvent is selected from the group consisting of methyl alcohol, ethyl alcohol, isopropyl alcohol, chloroform, dichloroethane, tetramethylene sulfone, benzene, acetone, xylene, toluene, N,N-dimethylformamide, dichloroethane, 1-methyl-2-pyrrolidinone and a mixture thereof.

7. The method of claim 1, wherein the heat-treatment is carried out at a temperature ranging from 400 to 1,500° C.

* * * * *